Feb. 8, 1949. W. SHAKESPEARE, JR 2,460,950
FISHING REEL
Filed Dec. 26, 1945
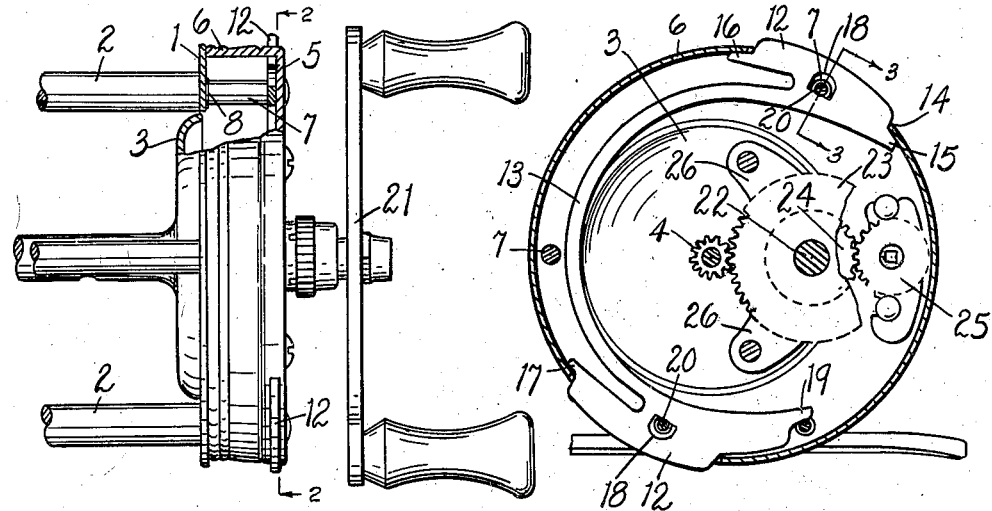
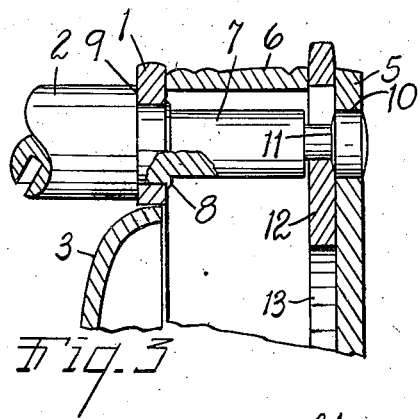
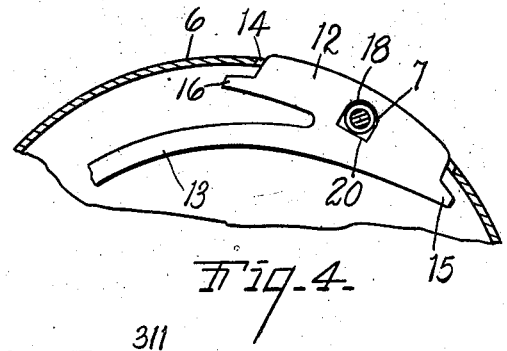
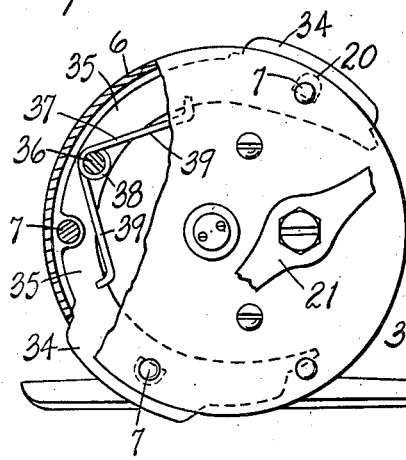
INVENTOR.
William Shakespeare, Jr.
BY Earl D. Chappell
ATTORNEYS.

Patented Feb. 8, 1949

2,460,950

UNITED STATES PATENT OFFICE 2,460,950

FISHING REEL

William Shakespeare, Jr., Kalamazoo, Mich., assignor to Shakespeare Company, Kalamazoo, Mich., a corporation of Michigan Application December 26, 1945, Serial No. 637,196

9 Claims. (Cl. 242—84.1)

This invention relates to improvements in fishing reels.

The main objects of this invention are:

First, to provide a fishing reel in which the chambered head member is quickly disengaged or released from the frame to permit cleaning and oiling of gears and bearing parts.

Second, to provide a fishing reel having these advantages which may be quickly disassembled to the extent indicated and at the same time one in which the parts when assembled are securely retained without looseness or rattling of the parts.

Third, to provide a structure embodying these advantages which is very economical to produce and at the same time economical in appearance.

Objects relating to details and economies of the invention will appear from the description to follow. The invention is defined and pointed out in the claims.

Preferred embodiments of the invention are illustrated in the accompanying drawing, in which:

Fig. 1 is a fragmentary side elevation of a structure embodying my invention shown partially in longitudinal section and partially broken away, only such parts of the reel being illustrated as are deemed essential to a full understanding of my invention.

Fig. 2 is a fragmentary view sectioned on line 2—2 of Fig. 1.

Fig. 3 is an enlarged fragmentary view partially in section on line 3—3 of Fig. 2.

Fig. 4 is an enlarged fragmentary view corresponding to that of Fig. 2 with one of the catches in released position.

Fig. 5 is an enlarged fragmentary view mainly in section of a modified form or embodiment of my invention.

Fig. 6 is a fragmentary end elevation partially in section of a further modified form or embodiment of my invention.

In the embodiment of my invention shown in Figs. 1 to 4, the frame comprises the annular frame end plate or member 1 and pillars 2, the pillars being connected to a tail plate or opposite end plate not illustrated. The opening in the end plate 1 is of such size as to permit the spool 3 to be inserted and removed therethrough. The spool is provided with a pinion 4.

The head plate 5 is provided with a flange 6, the flanged head plate being sometimes designated as a cap. This flanged head plate provides a chamber for certain parts to be described.

The pillars 2 have reduced end portions providing posts 7, the end plate 1 being fixedly secured on these posts by upsetting the posts at 8, thereby clamping the end plate against the shoulders 9 resulting from reducing the ends of the pillars to form the posts.

The head plate 5 is provided with holes 10 removably engaging the ends of the posts as shown in Fig. 3. These posts are provided with annular recesses 11 which constitute keepers with which the catches 12 coact for releasably or disengageably locking the head plate to the reel frame. The outer walls of the recesses 11 are slightly beveled as is most clearly shown in Fig. 3, to have a camming action on the catches 12. These catches 12 are formed as integral sheet metal stampings as is also the bowed spring 13, see Fig. 2.

The flange of the head plate has slots 14 therein disposed to receive the catches which project through the slots to constitute finger pieces, the peripheries of the catches being curved. The catches are provided with stop portions 15, 16 and 17 which engage the inner side of the flange 6 of the head plate to limit the outward movement of the catches. The catches have holes 18 and one of the catches a projection 19, the holes 18 receiving the posts and their inner edges 20 coacting with the keepers resulting from the recessing of the posts. The projection 19 also constitutes a catch.

The crank 21 is provided with a spindle 22 to which the gears 23 and 24 are secured, the gear 23 meshing with the spool pinion while the gear 24 meshes with the traversing shaft pinion 25 when the head member is in place. The bridge 26 carried by the head plate supports the inner end of the spindle.

With the parts thus arranged, the head plate, crank and the driving gears 23 and 24 and their supporting bridge 26 constitute an assembled unit. However, when the head plate is removed the gears are exposed for cleaning and oiling.

In the embodiment shown in Fig. 5, the head plate 27 has posts 28 fixedly secured thereto, these posts projecting into holes 29 in the reel end plate 30. The locking members or catches 31 in this embodiment are carried by the end member 31. They, however, coact with the keepers 32 in the post 28 the same as in the structure shown in Figs. 1 to 4. The keepers preferably have beveled or inclined surfaces 33 with which the catches coact.

In the embodiment of my invention shown in Fig. 6, the catches 34 are the same as those described with the exception that they do not have an integral spring portion. In this embodiment the catches are provided with arms 35 which pivotally engage the stud 36. The spring 37 is common to both catches, having a coil 38 engaging the stud and arms 39 engaging the arms 35 of the catches—otherwise the structure is the same as that shown in Figs. 1 to 4.

I have illustrated and described my invention in highly practical embodiments thereof. I have not attempted to illustrate or describe various modifications and adaptations which I contemplate as it is believed that this disclosure will enable those skilled in the art to embody or adapt my invention as may be desired.

The invention is capable of adaptation to various reel structures now in extensive commercial use. It will be observed that the head member is releasably secured without the use of screws or small parts or loose parts which is of great advantage to the fisherman as he is able to disassemble the reel for cleaning without the aid of tools and without danger of losing parts.

Having thus described my invention, what I claim as new and desire to secure by Letters Patent, is:

1. In a fishing reel, the combination of an annular frame end member, pillars having reduced end portions disposed through said end member and constituting head plate supporting posts, the frame member being fixedly secured to said pillars, a flanged head plate having holes therein receiving said posts, the head plate flange having oppositely disposed slots therein, the outer edges of the slots being in the plane of the inner side of the head plate, catches having peripherally curved grip portions projecting through said slots, said catches being provided with stops engaging the inner side of the flange to limit their outward movement and being connected by an integral bowed spring acting to releasably retain them in said slots and urge them yieldingly outward, said catches having holes therein receiving certain of said posts, such posts having recesses therein constituting keepers coacting with the catches, the outer walls of the keepers being cammed, a spool provided with a pinion, the opening in said frame end member being of such size as to permit the insertion and removal of a spool therethrough, a traversing shaft pinion carried by said end member, and a crank provided with a spindle, said head plate having a supporting bridge for said spindle, the spindle being provided with gears releasably engageable with the spool and traversing shaft pinion whereby the head plate and the parts mounted thereon may be removed and replaced as a unit.

2. In a fishing reel, the combination of a frame end member, pillars having reduced end portions disposed through said end member and constituting head plate supporting posts, the frame member being fixedly secured to said pillars, a flanged head plate having holes therein receiving said posts, the head plate flange having oppositely disposed slots therein, catches having grip portions projecting through said slots, said catches being provided with stops engaging the inner side of the flange to limit their outward movement and being connected by an integral bowed spring acting to releasably retain them in said slots and urge them yieldingly outward, certain of said posts having recesses therein constituting keepers coacting with the catches, a spool provided with a pinion, the opening in said frame end member being of such size as to permit the insertion and removal of a spool therethrough, a traversing shaft pinion carried by said end member, and a crank provided with a spindle, said head plate having a supporting bridge for said spindle, the spindle being provided with gears releasably engageable with the spool and traversing shaft pinion whereby the head plate and the parts mounted thereon may be removed and replaced as a unit.

3. In a fishing reel, the combination of a frame end member, pillars having reduced end portions disposed through said end member and constituting head plate supporting posts, the frame member being fixedly secured to said pillars, a flanged head plate having holes therein receiving said posts, the head plate flange having oppositely disposed slots therein, the outer edges of the slots being in the plane of the inner side of the head plate, and catches having peripherally curved grip portions projecting through said slots, said catches being provided with stops engaging the inner side of the flange to limit their outward movement and being connected by an integral bowed spring acting to releasably retain them in said slots and urge them yieldingly outward, said catches having holes therein receiving certain of said posts, such posts having recesses therein constituting keepers coacting with the catches, the outer walls of the keepers being cammed.

4. In a fishing reel, the combination of a frame end member, pillars having reduced end portions disposed through said end member and constituting head plate supporting posts, the frame member being fixedly secured to said pillars, a flanged head plate having holes therein receiving said posts, the head plate flange having oppositely disposed slots therein, and catches having grip portions projecting through said slots, said catches being provided with stops engaging the inner side of the flange to limit their outward movement and being connected by an integral bowed spring acting to releasably retain them in said slots and urge them yieldingly outward, certain of said posts having recesses therein constituting keepers coacting with the catches.

5. In a fishing reel, the combination of a frame end member, pillars having reduced end portions disposed through said end member and constituting head plate supporting posts, a head plate receiving said posts, catches projecting peripherally from said head plate, said catches being connected by an integral spring acting to urge them yieldingly to engaging position, said posts having recesses therein constituting keepers coacting with the catches, and a crank and a driving gear associated therewith mounted on said head plate to constitute an assembled unit therewith.

6. In a fishing reel, the combination of a frame end member, pillars having reduced end portions disposed through said end member and constituting head plate supporting posts, a head plate receiving said posts, and catches projecting peripherally from said head plate, said catches being connected by an integral spring acting to urge them yieldingly to engaging position, said posts having recesses therein constituting keepers coacting with said catches.

7. In a fishing reel, the combination of a frame end member, pillars having reduced end portions disposed through said end member and constituting head plate supporting posts, a head plate receiving said posts, catches mounted on the inner side of said head plate and projecting peripherally therefrom, a spring common to said catches acting to urge them outwardly, said posts having keepers with which the catches coact to releasably retain the head plate, and a crank and a driving gear mounted on said head plate to constitute an assembled unit therewith.

8. In a fishing reel, the combination of a frame end member, pillars having reduced end portions disposed through said end member and constituting head plate supporting posts, a head plate receiving said posts, and catches mounted on the inner side of said head plate and projecting peripherally therefrom, and a spring common to said catches acting to urge them outwardly, said posts having keepers with which the catches coact to releasably retain the head plate.

9. In a fishing reel, the combination of a frame, an end member, supporting posts for said end member supported by said frame, catches having finger pieces projecting from the periphery of said end member, and spring means acting to urge said catches outwardly, said posts being provided with keepers with which said catches coact to detachably secure said end member.

WILLIAM SHAKESPEARE, Jr.

REFERENCES CITED

The following references are of record in the file of this patent:

UNITED STATES PATENTS

| Number | Name | Date |
| --- | --- | --- |
| 731,226 | Rockwell | June 16, 1903 |
| 1,812,220 | Shakespeare, Jr. | June 30, 1931 |
| 1,871,386 | Pflueger | Aug. 9, 1932 |
| 2,071,474 | Schafer | Feb. 23, 1937 |